US007706565B2

(12) United States Patent
Levy et al.

(10) Patent No.: US 7,706,565 B2
(45) Date of Patent: Apr. 27, 2010

(54) MULTI-CHANNEL DIGITAL WATERMARKING

(75) Inventors: Kenneth L. Levy, Stevenson, WA (US); Steven W. Stewart, Tualatin, OR (US)

(73) Assignee: Digimarc Corporation, Beaverton, OR (US)

( * ) Notice: Subject to any disclaimer, the term of this patent is extended or adjusted under 35 U.S.C. 154(b) by 959 days.

(21) Appl. No.: 10/940,409

(22) Filed: Sep. 13, 2004

(65) Prior Publication Data

US 2005/0078851 A1    Apr. 14, 2005

Related U.S. Application Data

(60) Provisional application No. 60/507,801, filed on Sep. 30, 2003.

(51) Int. Cl.
G06K 9/00 (2006.01)
H04N 7/167 (2006.01)
H04N 11/00 (2006.01)

(52) U.S. Cl. .................. 382/100; 382/232; 348/460; 348/463; 380/54; 380/210; 380/252; 380/287

(58) Field of Classification Search .................. 382/100, 382/232; 713/176; 380/54, 210, 252, 287; 704/200.1, 273; 381/73.1; 348/460, 463
See application file for complete search history.

(56) References Cited

U.S. PATENT DOCUMENTS

| 4,495,620 | A | 1/1985 | Steele et al. |
|---|---|---|---|
| 5,319,735 | A | 6/1994 | Preuss et al. |
| 5,329,108 | A | 7/1994 | Lamoure |
| 5,337,361 | A | 8/1994 | Wang et al. |
| 5,612,943 | A | 3/1997 | Moses et al. |
| 5,636,292 | A | 6/1997 | Rhoads |
| 5,646,997 | A | 7/1997 | Barton |
| 5,721,788 | A | 2/1998 | Powell |
| 5,822,436 | A | 10/1998 | Rhoads |
| 5,835,639 | A | 11/1998 | Honsinger et al. |
| 5,848,155 | A | 12/1998 | Cox et al. |
| 5,859,920 | A | 1/1999 | Daly et al. |
| 5,949,055 | A | 9/1999 | Fleet et al. |
| 6,011,857 | A | 1/2000 | Sowell et al. |
| 6,018,593 | A | 1/2000 | Yamagata |
| 6,031,914 | A | 2/2000 | Tewfik et al. |
| 6,044,182 | A | 3/2000 | Daly |
| 6,272,176 | B1 | 8/2001 | Srinivasan |
| 6,282,300 | B1 | 8/2001 | Bloom et al. |
| 6,385,329 | B1 | 5/2002 | Sharma et al. |
| 6,408,082 | B1 | 6/2002 | Rhoads et al. |

(Continued)

OTHER PUBLICATIONS

O'Ruanaidh, "Rotation, Scale and Translation Invariant Digital Image Watermarking," Signal Processing, pp. 2-15, May 1, 1998.

(Continued)

*Primary Examiner*—Manav Seth

(57) ABSTRACT

The present invention provides digital watermarks through multiple channels. The channels can include, e.g., visible, ultraviolet and infrared channels. The non-visible channels can be selected to fluoresce either in the visible or IR/UV spectrums upon the appropriate illumination in the infrared or ultraviolet spectrums. The watermarks in the various multiple channels can cooperate to facilitate watermark detection or to authenticate an object in which the watermarks are embedded. In other implementations the multiple watermarks include so-called orientation components. A relative relationship between the orientation components is used to convey data.

19 Claims, 6 Drawing Sheets

U.S. PATENT DOCUMENTS

| | | | |
|---|---|---|---|
| 6,411,392 | B1 | 6/2002 | Bender et al. |
| 6,483,927 | B2 | 11/2002 | Brunk et al. |
| 6,516,079 | B1 | 2/2003 | Rhoads |
| 6,563,937 | B1 | 5/2003 | Wendt |
| 6,577,747 | B1 | 6/2003 | Kalker |
| 6,614,914 | B1 | 9/2003 | Rhoads et al. |
| 6,665,418 | B1 | 12/2003 | Honsinger |
| 6,671,388 | B1 | 12/2003 | Op De Beeck |
| 6,678,390 | B1 | 1/2004 | Honsinger |
| 6,683,966 | B1 | 1/2004 | Tian |
| 6,804,377 | B2 * | 10/2004 | Reed et al. ............ 382/100 |
| 6,845,170 | B2 * | 1/2005 | Wendt ................. 382/100 |
| 6,975,744 | B2 | 12/2005 | Sharma et al. |
| 7,007,167 | B2 * | 2/2006 | Kurahashi ............. 713/176 |
| 7,020,304 | B2 | 3/2006 | Alattar et al. |
| 7,046,819 | B2 | 5/2006 | Stach et al. |
| 7,072,490 | B2 | 7/2006 | Stach |
| 7,116,781 | B2 | 10/2006 | Rhoads |
| 7,340,076 | B2 | 3/2008 | Stach et al. |
| 2001/0055390 | A1 | 12/2001 | Hayashi |
| 2002/0002679 | A1 | 1/2002 | Murakami et al. |
| 2002/0062442 | A1 * | 5/2002 | Kurahashi ............. 713/176 |
| 2002/0114490 | A1 | 8/2002 | Taniguchi |
| 2003/0086609 | A1 | 5/2003 | Gangadhar |
| 2004/0146178 | A1 | 7/2004 | Donescu |
| 2004/0181671 | A1 * | 9/2004 | Brundage et al. ....... 713/176 |
| 2007/0016790 | A1 * | 1/2007 | Brundage et al. ....... 713/176 |

OTHER PUBLICATIONS

O'Runanaidh, "Rotation, Scale and Translation Invariant Digital Image Watermarking," 1997 IEEE, pp. 536-539.

Sheng, "Experiments on Pattern Recognition Using Invariant Fourier-Mellin Descriptors," Journal of Optical Society of America, vol. 3, No. 6, pp. 771-776, 1986.

Kutter, "Watermarking resisting to translation, rotation, and scaling," Proc. SPIE vol. 3528: Multimedia Systems and Applications, Nov. 1998, pp. 423-431.

Pereira et al., "Template Based Recovery of Fourier-Based Watermarks Using Log-Polar and Log-log Maps," Proc. IEEE Int. Conf. on Multimedia Computing and Systems, vol. 1, Jun. 1999, pp. 870-874.

Lin et al., "Rotation, scale, and translation resilient public watermarking for images," Proc. SPIE vol. 3971: Security and Watermarking of Multimedia Contents II, Jan. 2000, pp. 90-98.

Su et al., "An Image Watermarking Scheme to Resist Generalized Geometrical Transforms," Proc. SPIE vol. 4209: Multimedia Systems and Applications III, Nov. 2000, pp. 354-365.

Su et al., "Synchronized Detection of the Block-based Watermark with Invisible Grid Embedding," Proc. SPIE vol. 4314: Security and Watermarking of Multimedia Contents III, Jan. 2001, pp. 406-417.

Lin et al., "Rotation, Scale, and Translation Resilient Watermarking for Images," IEEE Transactions on Image Processing, vol. 10, No. 5, May 2001, pp. 767-782.

Nikolaidis et al., "Region-Based Image Watermarking," IEEE Transactions on Image Processing, vol. 10, No. 11, Nov. 2001, pp. 1726-1740.

* cited by examiner

= 00

= 01

= 10

= 11

| 000000 | 000001 | 000010 | . . . . | | | | |
|---|---|---|---|---|---|---|---|
| | | | | | | | |
| | | | | | | | |
| | | | | | | | |
| | | | | | | | |
| | | | | | | | |
| | | | | | | . . . . | 111111 |

MULTI-CHANNEL DIGITAL WATERMARKING

RELATED APPLICATION DATA

The present application claims the benefit of U.S. Provisional Patent Application No. 60/507,801, filed Sep. 30, 2003. The present application is related to assignee's U.S. patent application Ser. Nos. 09/945,243, filed Aug. 31, 2001 (published as US 2002-0090112 A1), 10/172,769, filed Jun. 14, 2002 (published as US 2003-0025423 A1) and 10/330,032, filed Dec. 24, 2002 (published as US 2003-0173406 A1), PCT Patent Application No. PCT/US02/20832 (published in English as WO 03/005291) and U.S. Pat. No. 6,614,914. Each of these patent documents is herein incorporated by reference.

FIELD OF THE INVENTION

The present invention relates generally to methods and systems for steganographically embedding data. A preferred form of steganography is digital watermarking. More particularly, the present invention relates to steganographically embedding digital watermarks in multiple channels. The multiple channels can be carried by an identification document.

BACKGROUND AND SUMMARY OF THE INVENTION

Today's counterfeiters are shrewd and technically savvy. Advances are needed to complicate the counterfeiter's efforts. Moreover, some of today's watermarking applications require additional data carrying capacity.

One solution is to embed steganographic auxiliary data variously in multi-channels carried by an object.

One form of steganography is digital watermarking. Digital watermarking systems typically have two primary components: an encoder that embeds a watermark in a host media signal, and a decoder (or reader) that detects and reads the embedded watermark from a signal suspected of containing a watermark. The encoder can embed a watermark by altering the host media signal. The decoding component analyzes a suspect signal to detect whether a watermark is present. In applications where the watermark encodes information, the decoder extracts this information from the detected watermark. Data can be communicated to a decoder, e.g., from an optical sensor (e.g., a web camera, digital camera, scanner, etc.).

A watermark can have multiple components, each having different attributes. To name a few, these attributes include function, signal intensity, transform domain of watermark definition (e.g., temporal, spatial, frequency, etc.), location or orientation in host signal, redundancy, level of security (e.g., encrypted or scrambled), etc. The components of the watermark may perform the same or different functions. For example, one component may carry a message, while another component may serve to identify the location or orientation of the watermark. Moreover, different messages may be encoded in different temporal or spatial portions of the host signal, such as different locations in an image or different time frames of audio or video. In some cases, the components are provided through separate watermarks.

The physical manifestation of watermarked information most commonly takes the form of altered signal values, such as slightly changed pixel values, picture luminance, picture colors, DCT coefficients, instantaneous audio amplitudes, etc. However, a watermark can also be manifested in other ways, such as changes in the surface microtopology of a medium, localized chemical changes (e.g. in photographic emulsions), localized variations in optical density, localized changes in luminescence, etc. The surface texture of an object may be altered to create a watermark pattern. This may be accomplished by manufacturing an object in a manner that creates a textured surface or by applying material to the surface (e.g., an invisible film or ink) in a subsequent process. Watermarks can also be optically implemented in holograms or embedded in conventional paper watermarks.

Some techniques for embedding and detecting watermarks in media signals are detailed in the assignee's U.S. Pat. Nos. 6,122,403 and 6,614,914, and in PCT patent application PCT/US02/20832 (published as WO 03/005291), which are each herein incorporated by reference.

In the following disclosure it should be understood that references to watermarking and steganographic hiding encompass not only the assignee's technology, but can likewise be practiced with other steganographic technologies as well.

According to one aspect of the present invention an identification document includes a photographic representation of a bearer of the document and indicia printed thereon. The identification document further includes a first digital watermark component conveyed through a first channel which is visibly perceptible under visible lighting conditions; a second digital watermark component conveyed through a second channel which is substantially non-visible under visible lighting conditions, but at least a portion of the second channel becomes visible with infrared illumination; and a third digital watermark component conveyed through a third channel which is substantially non-visible under visible lighting conditions, but at least a portion of the third channel becoming visible with ultraviolet illumination.

Another aspect of the present invention provides a method of authenticating a physical object. The object includes a first digital watermark conveyed through a first channel and at least a second digital watermark conveyed through a different, second channel. The first digital watermark includes a first orientation component conveying a first orientation and the second digital watermark includes a second orientation component conveying a second orientation. The first orientation is different than the second orientation. The method includes: receiving optical scan data representing at least some of the object; analyzing the optical scan data to recover the first orientation component and the second orientation component; determining, based at least on the first orientation component and the second orientation component, the first orientation and the second orientation; and deciding whether the object is authentic based on at least one of the first orientation and the second orientation.

Yet another aspect of the present invention is a method of conveying auxiliary data through digital watermarking. The method includes: providing a first digital watermark signal comprising a first orientation component; providing a second digital watermark signal comprising a second orientation component; conveying the auxiliary data through a relative orientation relationship of the first orientation component and the second digital watermark component.

The foregoing and other features, aspects and advantages of the present invention will be even more readily apparent from the following detailed description, which proceeds with reference to the accompanying drawings.

DETAILED DESCRIPTION

Introduction

Figure 1:
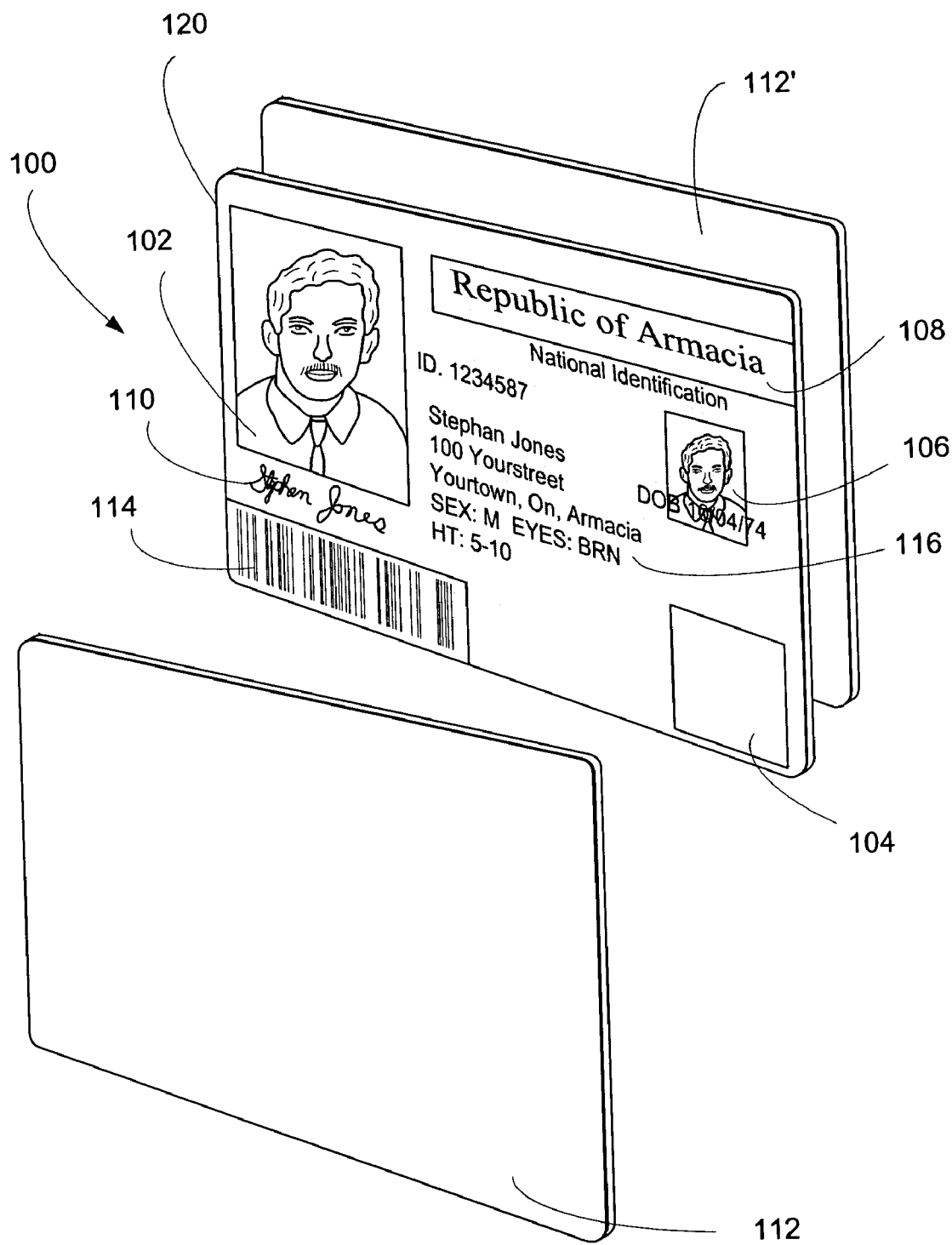
FIG. 1 illustrates an identification document including three digital watermarks.

The present invention provides data steganographically embedded in multiple channels. The term "channel" in this application is generally used to refer to a mechanism, material or medium through which data can be steganographically carried. A few examples of channels are ink, dye, toner, optical variable devices, holograms, spatial or frequency transform domains, laser engraving, emission or excitation frequencies/wavelengths, embossing, foil stamping, and intaglio. Other examples include chemical washing or processing and surface texturing. While the present invention will benefit many types of physical objects and printed documents, the preferred embodiments are illustrated with respect to identification documents.

Identification Documents

For the purposes of this disclosure, identification documents are broadly defined and may include, e.g., credit cards, bank cards, phone cards, passports, driver's licenses, network access cards, employee badges, debit cards, security cards, visas, immigration documentation, national ID cards, citizenship cards, social security cards, security badges, certificates, identification cards or documents, voter registration cards, police ID cards, border crossing cards, legal instruments, security clearance badges and cards, gun permits, gift certificates or cards, membership cards or badges, etc., etc. Also, the terms "document," "card," and "documentation" are used interchangeably throughout this patent document. Identification documents may also be referred to as "ID documents."

Identification documents can include information such as a photographic image, a bar code (e.g., which may contain information specific to a person whose image appears in the photographic image, and/or information that is the same from ID document to ID document), variable personal information (e.g., such as an address, signature, and/or birth date, biometric information associated with the person whose image appears in the photographic image, e.g., a fingerprint), a magnetic stripe (which, for example, can be on a side of the ID document that is opposite a side with a photographic image), and various security features (e.g., a security pattern like a printed pattern comprising a tightly printed pattern of finely divided printed and unprinted areas in close proximity to each other, such as a fine-line printed security pattern as is used in the printing of banknote paper, stock certificates, and the like). Of course, an identification document can include more or less of these types of features.

One exemplary ID document comprises a core layer (which can be pre-printed), such as a light-colored, opaque material, e.g., TESLIN, which is available from PPG Industries) or polyvinyl chloride (PVC) material. The core can be laminated with a transparent material, such as clear PVC to form a so-called "card blank". Information, such as variable personal information (e.g., photographic information, address, name, document number, etc.), is printed on the card blank using a method such as Dye Diffusion Thermal Transfer ("D2T2") printing (e.g., as described in commonly assigned U.S. Pat. No. 6,066,594, which is herein incorporated by reference), laser or ink jet printing, offset printing, etc. The information can, for example, comprise an indicium or indicia, such as the invariant or nonvarying information common to a large number of identification documents, for example the name and logo of the organization issuing the documents. The information may be formed by any known process capable of forming the indicium on the specific core material used.

To protect the information that is printed, an additional layer of transparent overlaminate can be coupled to the card blank and printed information, as is known by those skilled in the art. Illustrative examples of usable materials for overlaminates include biaxially oriented polyester or other optically clear durable plastic film.

Of course, there are many other identification documents that include different structures and materials. These other identification documents can be suitably interchanged with the identification documents described herein. The inventive techniques disclosed herein will similarly benefit these other documents as well.

Multi-Channel Watermarking

The present invention provides data variously through multiple channels carried by the same object or document. The data is preferably steganographically provided by the channels. A first channel can be, for example, ink, dye, toner or laser engraving that is visible in the visible spectrum. A second channel can be, for example, ink, dye, toner or other material that is generally imperceptible in the visible spectrum unless illuminated in another spectrum, e.g., the infrared spectrum. For example, IR ink may fluoresce in the visible spectrum when it is illuminated in the infrared spectrum. A third channel can be, for example, ink, dye, toner or other material that is generally imperceptible in the visible spectrum unless illuminated in another spectrum, e.g., the ultraviolet spectrum. For example, UV ink may fluoresce in the visible spectrum when it is illuminated in the ultraviolet spectrum. Suitable channel materials are provided e.g., by Photo-Secure, headquartered in Boston, Mass. USA (under the trade name "SmartDye") or provided by others like HP, e.g., HP's so-called invisible ink for their Indio printers and UV inks for HP's DesignJet line of printers, etc. Of course, there are many other ink/dyes that can be suitable interchanged with the above-mentioned materials. Other types of materials, e.g., thermochromic, magnetic, water-fugitive, chemically-reactive, other photochromic, flash-reactive, can also provide suitable channels.

Separate Spatial Locations with Detection in the Visible Spectrum

With reference to FIG. 1, an identification document 100 steganographically conveys auxiliary data through three channels. The channels will be typically printed (e.g., laser printed, D2T2, offset, thermal transferred, etc.) or otherwise provided on the document 100 or to a document 120 surface. In some cases the channels will be provided in separate document layers, like an overlaminate 112 or 112'. In these cases the overlaminate 112 or 112' can be separately printed or otherwise treated to convey a watermark component and then attached to the document 100. As shown in FIG. 1, three channels 102, 104 and 106 are provided in non-overlapping spatial areas.

Along with a first watermark component, channel 102 conveys a representation (e.g., photograph) of a bearer of the identification document 100. Channel 102 is preferably perceptible in a visible spectrum under normal lighting conditions. It should be appreciated, however, that channel 102 could include different representations besides a photograph, e.g., like a graphic, artwork, background tint or pattern, seal, ghost (or faint) image, etc. Channel 102 includes a first digital watermark component embedded therein. While the first digital watermark component is not limited in form or function, it preferably includes at least a first plural-bit message or payload field. The first digital watermark component may also include a so-called orientation signal or component, which is helpful in resolving image distortion such as rotation, scale and translation. See, e.g., U.S. Pat. No. 6,614,914 for even further details regarding orientation components.

Channel 104 fluoresces (or becomes visible) in the visible spectrum, but only with illumination in a first non-visible spectrum. For example, channel 104 is visibly perceptible, but only with illumination in the infrared spectrum (or with illumination at a particular frequency in the infrared spectrum). Channel 104 includes a second digital watermark component embedded therein. While the second digital watermark channel is not limited in form or function, it preferably includes at least a second plural-bit message or payload field. The second digital watermark component may also include an orientation signal or component. Although not illustrated as such, channel 104 alternatively conveys visible features like artwork, graphics, state seals, background pattern or tint, etc., when illuminated in the first non-visible spectrum. The second channel watermark can be embedded in these features, or printed as a pure or raw signal (e.g., in a tint or background-like pattern).

Channel 106 fluoresces (or becomes visible) in the visible spectrum, but only with illumination in a second non-visible spectrum. For example, channel 106 is visibly perceptible only with illumination in the ultraviolet spectrum (or with illumination at a particular frequency in the ultraviolet spectrum). Channel 106 includes a third digital watermark component embedded therein. While the third digital watermark channel is not limited in form or function, it preferably includes at least a third plural-bit message or payload field. The third digital watermark component may also include an orientation signal or component. As shown, channel 106 can also convey features that visibly fluoresce with illumination in the second non-visible spectrum.

Channel 104 and 106 may be optionally provided over features (e.g., images, text, and artwork) that are visible with normal or ambient lighting.

Of course the identification document 100 optionally can include a variety of other features like signature 108, fixed information 110 (e.g., information which is generally the same from ID document to ID document), other machine-readable information (e.g., bar codes, 2D bar codes, optical memory, etc.) 114, variable information (e.g., information which generally varies from document to document, like bearer's name, address, document number, etc.) 116, etc. The document may also include overprinting (e.g., DOB over or under channel 106). Watermarks can be redundantly embedded to help prevent reading errors due to such overprinting.

Figure 2:
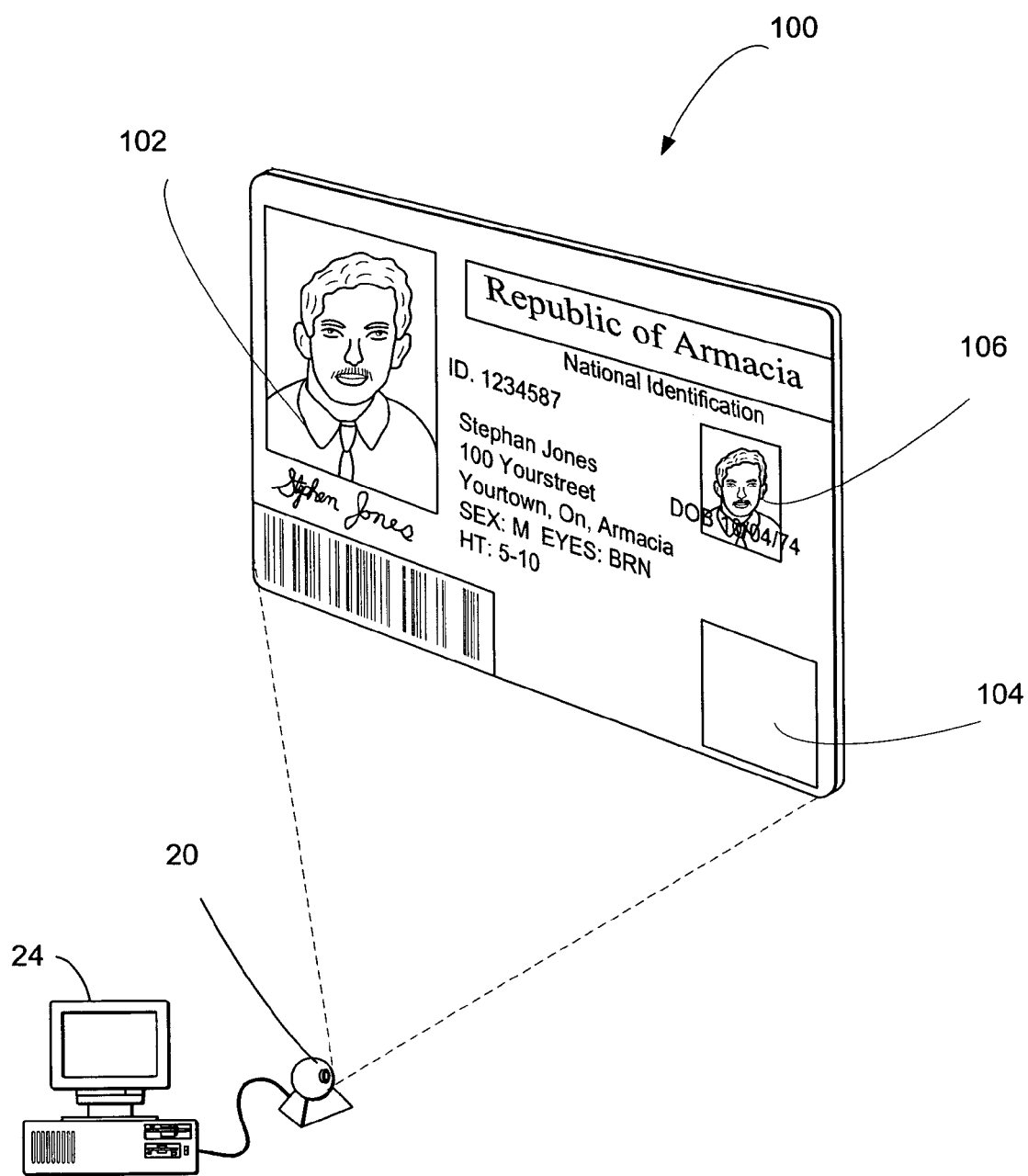
FIG. 2 illustrates optical sensing of the FIG. 1 identification document.

To detect the first, second and third watermarks, the identification document 100 is illuminated with ambient light (or visible light), and appropriate infrared and ultraviolet light. For example, if needed, channels 104 and 106 are illuminated at a particular frequency within the infrared or ultraviolet spectrums. With reference to FIG. 2, an optical sensor 20 includes an illumination source (not shown). The illumination source includes infrared and ultraviolet illumination source, e.g., IR and UV LEDS. The optical sensor 20 can also include a visible light source (e.g., visible LED). In some cases the visible light source and the infrared light source (and perhaps even the UV source) are combined. The illumination source can be enclosed or shielded (not shown) to help control the illumination, with the identification document 100 being inserted through an opening for scanning. The visible, infrared and ultraviolet illumination causes the first, second and third watermarks to become detectable with visible light scanning of the document. Accordingly, optical sensor 20 captures scan data representing the identification document 100, including the three channels.

The optical scan data is communicated from the optical sensor 20 to a watermark detector 24, e.g., software executing on a computer processor. The watermark detector 24 analyzes the optical scan data to decode the first, second and third watermark components. The decoded watermark components can be used to authenticate the identification document 100 or to provide information regarding document 100 or an authorized bearer of the document 100.

Multi-Channel Watermark Cooperation

Watermarks within different channels can be intertwined or otherwise designed to cooperate with one another. Intertwining the watermarks help to bind the watermarks to one another and/or to an identification document. Consider a few examples.

All three watermarks include redundant plural-bit information. For example, the channel 102 watermark may include the identifier "1010" or some other number. The identifier may correspond to a document identification number, a birth date, or a random, pseudo-random or cryptographically generated number. The same identifier—1010—is carried by both the second and third watermarks. Once the three watermarks are decoded, the payloads can be compared to determine whether they each include the 1010 identifier. If 1010 is expected to correspond to an identification document number, the watermark payloads can be compared to that number as well. This example is helpful to detect feature swapping, e.g., swapping a photographic from one ID to another.

In a variation of the above example, one digital watermark includes a payload—say, for example, the same "1010." Each of the other two watermarks includes a cryptographic permutation of 1010. A watermark decoder or an application cooperating with a watermark decoder preferably knows the cryptographic relationship. The watermark decoder decodes the watermarks to see if they correspond to one another in the expected cryptographic manner. If they do not, the identification document is considered suspect.

A message or authentication information may be distributed between two or more of the watermarks. For example, consider a message that includes the following bit string: 101011110101. The message can be segmented as follows:

| 1010 | 1111 | 0101 |

The first digital watermark carries the first portion (1010) of the message, the second digital watermark carries the second portion (1111) and the third digital watermark carries the third portion (0101). All three watermarks must be successfully decoded to recover the complete message. Of course, the watermarks may include additional information, like checksums to verify the integrity of the message segments. If one watermark is copied, but not the other two, the full message is incomplete—perhaps evidencing a counterfeiting attempt.

The three watermarks can be associated through a cryptographic relationship. For example, a first watermark includes data representing an attribute of the identification document. The attribute may include, e.g., features (e.g., a hash or other representation) of a photographic image carried by the document or a document number or birth date. The photograph can be printed on the document or carried in electronic circuitry. The first watermark is, therefore, linked to the photograph via the photograph's features carried in its payload. A second watermark includes a first cryptographic permutation or hash of the feature. The second digital watermark is then tied or associated with both the first watermark and the photograph. The third digital watermark can include the same first cryptographic permutation, but preferably includes a different second cryptographic permutation. The second cryptographic permutation can be computed either from the feature itself or from the first permutation. In a related case, instead of carrying a second permutation in the third watermark, the third watermark includes a corresponding key to decode the first permutation. Or, as another alternative, a first permutation or hash is distributed between the second and third watermarks.

A watermark in a first channel can carry information necessary to recover information in the second and third channels. For example, a visible light watermark can include information corresponding to a particular frequency or frequency range to illuminate the infrared or ultraviolet watermarks. A watermark decoder decodes the frequency information from the watermark, provides the frequency to calibrate an optical sensor or illumination source. The optical sensor or illumination source illuminates the identification document as suggested by the frequency information to capture scan data associated with the infrared or ultraviolet watermarks. Or one of the watermarks can carry a key to decode or decrypt the second or third watermarks. Similarly, if one or more of the watermarks are embedded using a frequency-based watermark scheme, one of the watermarks can include frequency band information of where to locate the watermark information. Still further, a first watermark may include a so-called legacy trigger (e.g., designated payload bit(s)). The legacy trigger may indicate the presence of a second and third watermark. If a watermark detector detects a legacy trigger, the optical sensor is prompted to illuminate with the IR and UV sources, allowing optical data capture of the second and third watermarks. (Or the trigger can prompt a detector to search for the second and third watermarks, with the illumination source providing constant or timed UV or IR illumination.) But if the legacy trigger is not detected, the detector can still handle the identification document without searching for the second or third non-visible channel watermarks.

The watermark data carrying capacity can vary and need not be the same. For example, channels 104 and/or 106 may provide a high data carrying capacity watermark signal. Since these UV and IR materials are not generally visibly noticeable, except under predetermined lighting conditions, there is little risk of an aesthetically displeasing disruption of the identification document even with large data payloads. IR and UV materials are printed or "tinted" across a desired document area to convey a watermark signal. Channel 104 and 106 can provide a high capacity watermark signals without aesthetically disrupting the identification document, since they are not generally noticeable, expect under the predetermined lighting conditions. The watermark data capacity for an identification document is greatly enhanced. These watermarks can also carry independent orientation signals, which are helpful in detecting a watermark message or payload.

As discussed above, a watermark may include a so-called orientation component. An orientation component is helpful in resolving image distortion such as rotation, scale and translation. Image scan data associated with a watermarked identification document can be returned near to an expected or original state with the help of such an orientation component, which allows for more accurate payload detection and decoding. Examples of watermark orientation techniques are found, e.g., in assignee's U.S. Pat. No. 6,614,914 and U.S. Published Patent Application No. US 2003-0039377 A1, which are each herein incorporated by reference. Not all of the three channels 102, 104 and 106 needs to include an orientation component. Indeed, watermark detection of one or two of the watermarks may rely on orientation information provided by an orientation component carried by the first digital watermark. A fair assumption is that if one portion of scan data is distorted (e.g., rotated, scaled or offset from an origin) other portions will be similarly distorted, particularly when the watermarks are embedded at the same embedding resolution and rotational orientation. Even if the watermarks are not embedded at a similar resolution, an expected orientation relationship between the embedding of the watermarks can be used to resolve unwanted image distortion. In summary, an orientation component in one channel can be used to decode watermarks embedded in different channels. Sharing a watermark component is particularly advantageous, for example, when the orientation signal is conveyed in the IR or UV channel, since a visible watermark payload will most likely be unrecoverable without appropriate orientation from an orientation component.

Spatially Overlapping Channels

Figure 3:
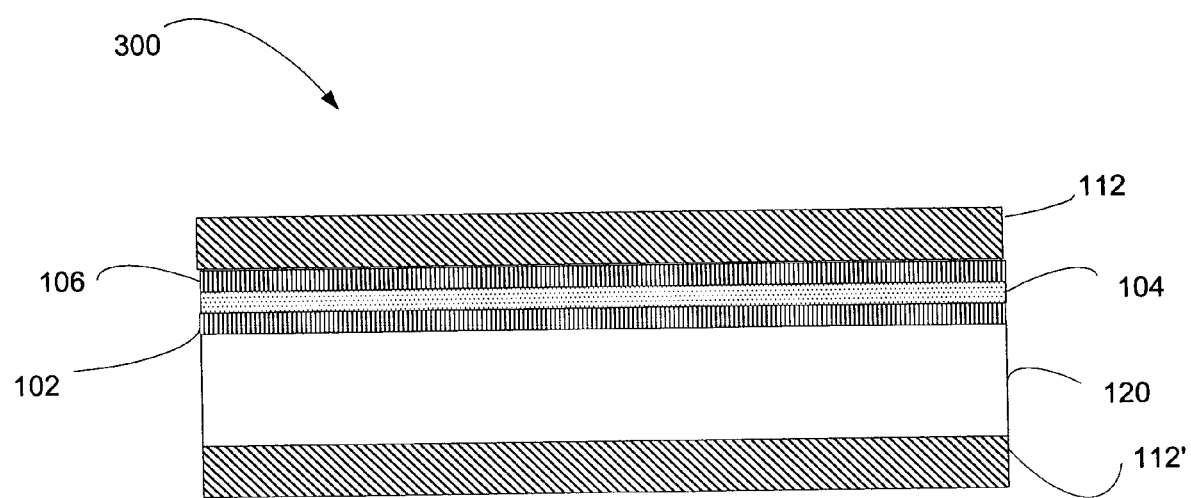
FIG. 3 illustrates a cross sectional view of an identification document including spatially overlapping channels.

While channels 102, 104 and 106 are illustrated in FIG. 1 as occupying non-overlapping spatial areas of identification document 100, the present invention is not so limited. For example, two or more channels can overlap (or be layered) as shown in the FIG. 3 cross-sectional view of an identification document 300. (More accurately, FIG. 3 corresponds to a portion of an identification document 300 where three channels are overlapping. It should be appreciated that not every channel (or channel portion) needs to overlap with the other two channels. In some cases, only two of the three channels will overlap.) Some non-visible (e.g., UV and IR) channel materials appear transparent or opaque under normal or visible lighting. Thus, overlapping the channels preferably will not interfere with visible characteristics of the identification document, except under appropriate ultraviolet or infrared illumination.

The channels include the same channels as discussed above; that is, channel 102 is visible in a visible spectrum under normal (e.g., visible light) lighting conditions; channel 104 is visible in the visible spectrum, but only with illumination in the infrared spectrum (or at a particular frequency in the infrared spectrum); and channel 106 is visible in the visible spectrum, but only with illumination in the ultraviolet spectrum (or at a particular frequency in the ultraviolet spectrum). Channels 102, 104 and 106 each include a watermark or watermark component embedded therein.

Some care is preferably taken to ensure that the watermarks do not destructively interfere with one another, since they are spatially overlapping and are each visibly detectable with appropriate illumination. Techniques for avoiding interference between the watermarks are discussed below.

Figure 4:
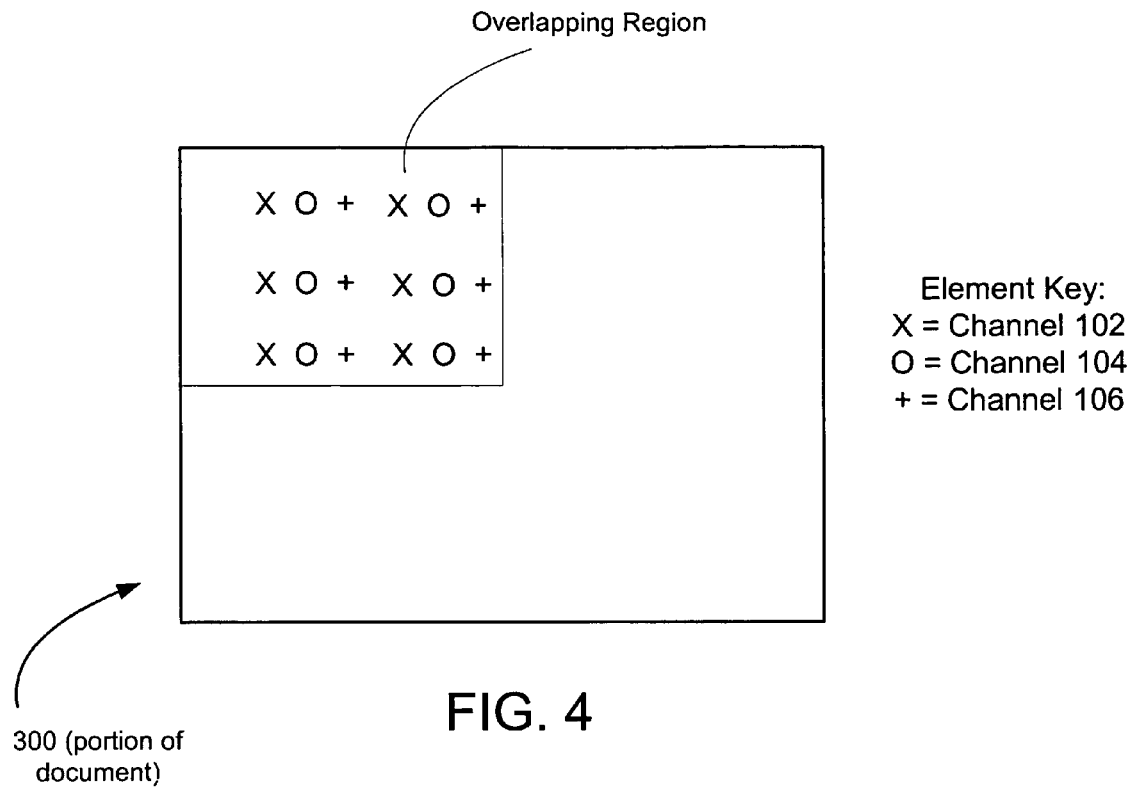
FIG. 4 illustrates spatial interleaving of multi-channel watermark elements.

The three watermarks can be spatially interleaved. For example, individual elements of the different watermarks are spatially aligned so as to not interfere with one another. As shown in FIG. 4, the different watermarks include different elements. An element may be manifested by a slight adjustment to an image region, pixel or group of pixels, etc. A corresponding watermark decoder is configured to search out spatial image areas that correspond to an individual watermark and collect only the elements belonging to that watermark. A similar process is carried out to collect and decode the remaining, different watermark elements.

If the watermark embedding employs a frequency-domain watermarking scheme, different watermarks can be embedded at different frequencies. The different frequencies are selected to balance visibility concerns while minimizing interference between the watermarks.

Similarly, if embedding in the spatial domain, the watermarks can be embedded at different embedding resolutions. The watermark detector can operate to search for the different watermarks at expected different resolutions, or at relative resolutions in comparison to one or more of the watermarks.

If using a pseudo-random (PN) based watermarking technique, a different and preferably orthogonal PN key can be used to generate each watermark. The different PN keys will help to ensure that the two watermarks do not destructively interfere. Most PN sequences will be orthogonal, e.g., the elements multiply and sum to zero. However, an embedding system can verify that the two PN keys provide orthogonal sequences before using the two different PN keys.

Watermark interference is not necessary a negative, but instead can be used as an authentication advantage. Consider, for example, an implementation where watermark elements of the different watermarks are intentionally registered or spatially aligned so that they add constructively. One watermark—by itself—may be too faint or weak to trigger detection. However, the signal is strengthened when the watermark elements are added together. The watermarks in this case include corresponding information and redundant elements so as to constructively interfere or reinforce one another. Thus, without expected UV or IR illumination to excite the channel 104 and channel 106 watermarks, the channel 102 watermark may be too faint to yield a noticeable watermark read.

A so-called fragile watermark can be constructed using these techniques. The fragile watermark is designed through constructive interference of the three watermarks. If one or more of the watermarks is not present, the watermark is undetectable or is at least predictably degraded. For example, if the UV channel watermark is somehow lost in a counterfeiting effort, the collective visible and IR watermarks may be only faintly detectable (as determined, e.g., via a signal-to-noise metric). Thus, the three watermarks reinforce the intended watermark signal.

We note that some care is taken to ensure that a printing system is able to correctly register the three watermarks on a document surface. Properly registering the various watermarks may help in implementations, e.g., where a first watermark provides an orientation signal for the other watermarks, where the watermarks are intended to constructively interfere with one another, and/or where watermarks are spatial interleaved to convey a collectively (or separate) message, etc. In some implementations, a watermark detector reads a visible channel watermark, corrects for any distortion, and then provides data to help align a printing process so that an IR or UV channel is properly aligned or properly oriented to convey the invisible watermarks over the visible watermark.)

While some of the above examples have focused on spatial reinforcement, the present invention also envisions frequency-domain based reinforcement as well.

Another constructive interference implementation uses portions of the different watermark signals to construct a single watermark signal or payload structure. For example, consider a message that includes the following bit string: 111110100101. The message can be segmented as follows:

| 1111 | 1010 | 0101 |

A first digital watermark carries the first portion (1111) of the message, the second digital watermark carries the second portion (1010) and the third digital watermark carries the third portion (0101). The different watermarks provide signal attributes (or elements) to reflect the message portion that they carry, which collectively make up the final message. One way to manifest the collective message signal is to spatially interleave various message elements so that a detector will interpret the spatially interleaved elements as a single message. Of course, instead of distributing a message component, other watermark components can be distributed throughout the three watermarks as well.

Some watermarking techniques use a relative relationship between transform domain correlation peaks to convey auxiliary data. Data can be conveyed or derived through a relative relationship—or shift—between two correlation peaks. Correlation based watermarking is discussed, e.g., in U.S. Pat. No. 6,505,223, which is herein incorporated by reference. An improvement is to design and provide three or more watermarks for an identification document so as to introduce a third correlation peak. The auxiliary data can be conveyed through a relationship between the three or more correlation peaks.

Authenticating and Conveying Data Through Watermark Orientation Components

A multi-channel watermarking implementation can convey information with so-called orientation components carried in the multiple channels.

Figure 5:
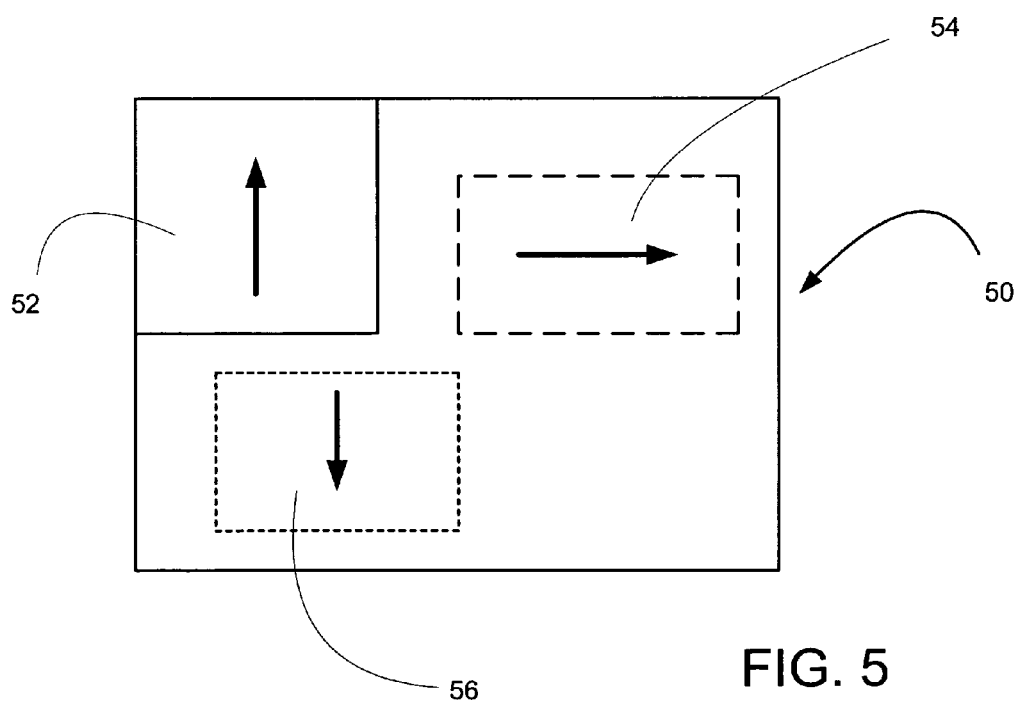
FIG. 5 illustrates orientations for three different watermark orientation components.
Figure 6A:
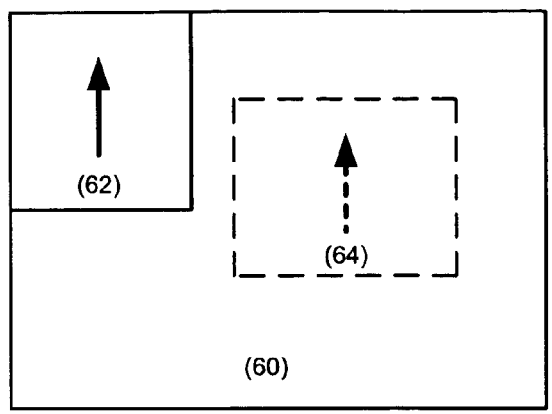
FIGS. 6A-6D illustrate relative orientation relationships for two watermark components. The various orientation relationships convey auxiliary data.
Figure 6B:
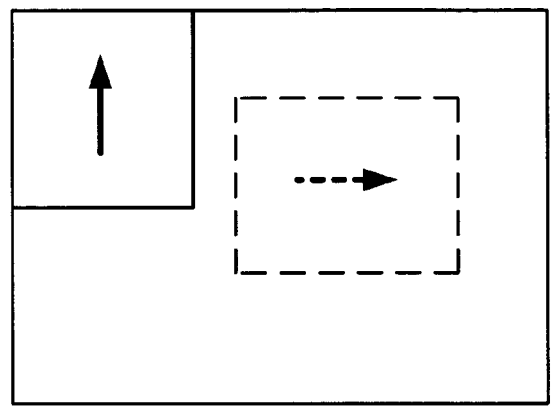
Figure 6C:
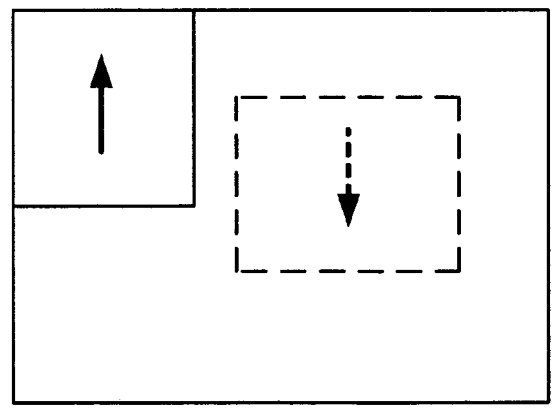
Figure 6D:
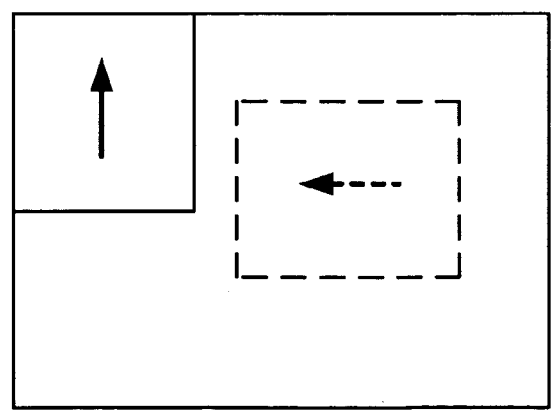

With reference to FIG. 5, an identification document 50 includes at least three watermarks in three different channels—a first watermark in a visible channel, a second watermark in an infrared channel and a third watermark in an ultraviolet channel. The watermarks can be redundantly embedded across predetermined document spatial regions. For example, each of the first watermark, second watermark and third watermark is redundantly embedded in a different spatial region 52, 54 and 56, respectively. (Although not illustrated as such, an embedding area or channel can be divided into a grid-like pattern, which each grid tile including a redundant instance of a respective watermark.). Each of the first watermark, second watermark and third watermark includes an orientation component (represented as "arrows" in FIG. 5).

A relative orientation of the embedded orientation components is used as an authentication clue. For example, the first watermarked area 52 includes orientation components at a first orientation (e.g., at a first scale, first rotation angle and/or first translation—represented by the "up" arrow). The second watermarked area 54 includes orientation components at a second, different orientation (e.g., at a second scale, second rotation angle and/or second translation—represented by the "sideways" arrow). The third watermarked area 56 includes its orientation components at a third, different orientation (e.g., at a third scale, third rotation angle and/or third translation—represented by the "down" arrow). A relative orientation of the three areas can be determined from an identification document and compared against an expected orientation relationship. (The expected orientation can be even carried by one or more of the digital watermark payloads. The orientation relationship can then vary from document to document.). When a document has an orientation relationship that is different than expected, the document is considered suspect. These techniques are particularly helpful to deter so-called photo swapping, where a photograph is cut-and-pasted from one document to another, since an expected orientation relationship (e.g., translation from a predetermined origin) will be difficult to properly align even if it is known.

Auxiliary data can be conveyed through a relative relationship (or differences) of two or more watermark orientation components. Let's start with a relatively simple example as shown in FIGS. 6A-6D. An object 60 (e.g., an identification document) includes at least a first digital watermark 62 and a second digital watermark 64. The first digital watermark 62 includes a first orientation component (represented by a solid arrow), and the second digital watermark 64 includes a second orientation component (represented by a dashed arrow). The first orientation component establishes a base or reference orientation. Data is conveyed through the orientation of the second orientation component relative to the first orientation component. Four data states (00, 01, 10 and 11), based on the relative orientation of the two watermark orientation components, can be defined as shown in FIGS. 6A-6D.

A watermark detector detects the first and second orientation components, realigns image data to restore the image data to an orientation corresponding to the first orientation component (e.g., resolves image distortion as determined by the first orientation component), and then determines which of the four states the orientation of the second watermark's orientation component best corresponds to. The data states can be used to convey a particular encryption scheme, signal a type of watermark payload format, and/or to convey copy control states or other data. Of course, more states can be added and tolerances can be established (e.g., an orientation is considered to represent one of the four states if it is within plus or minus 5-25 degrees from a base rotation state, or within 0.1 to 0.2 inches from a base origin, etc.). And more data bits can be added through a comparison of a third watermark's orientation component, relative to the first or second orientations. Thus, in a two or more watermark implementation, data can be conveyed both through a payload, and through a relative relationship of at least a first watermark orientation component and a second watermark orientation component. Watermarks can be embedded at different orientations to achieve a desired data state.

Figures 7, 8:
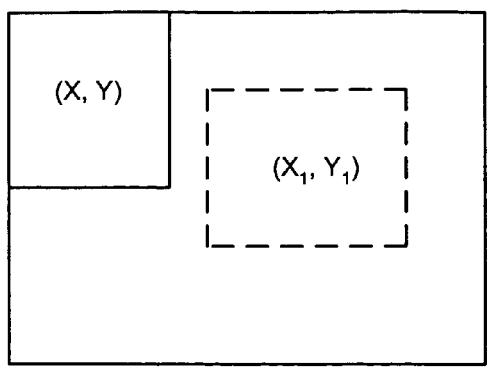
FIG. 7 illustrates an orientation relationship for two watermarks.
FIG. 8 illustrates a grid for conveying data according to a relative orientation for two watermark orientation signals.

Now consider a slightly more involved example with reference to FIGS. 7 and 8. An object includes first and second digital watermarks, both including an orientation component, e.g., an "X,Y" and "$X_1,Y_1$" representing a translation from an origin, as shown in FIG. 7. (Of course, an orientation component could convey data like relative rotation, scale, message starting point, etc.) Data is conveyed in this example through a relative orientation of the first and second orientation components. Orientations for the second orientation component—relative to the first orientation component—can be represented as a multi-tile grid including a plurality of elements (e.g., 64 elements as shown in FIG. 8). Each of the elements within the grid represents a particular orientation of the respective second orientation component. Dividing the orientation components into 8×8 tiles (64 elements per grid) allows a relative relationship of the two orientation components to carry 6 bits of information. (For 128×128 pixel tiles, this dividing scheme produces individual elements that include 16×16 pixels, which is reasonable for standard printing and detection methods.). The second orientation component is embedded at one of 64 different relative orientations. Once decoded, the orientation can be used to determine which particular code sequence the relative orientation corresponds to. (As with many of the implementations discussed herein, the different watermark orientation component can be conveyed through different channels, e.g., visible, ultraviolet, infrared, thermochromic, magnetic, water-fugitive, chemical-reactive, and different domain and/or frequency channels.). By way of example, the FIG. 8 grid can spatially represent the translation of a watermark (e.g., in the dashed area) relative to an origin falling within one of the watermarked areas in FIG. 7.

In alternative embodiments, an orientation signal is not shifted or varied, but the digital watermark payload is shifted relative to the orientation signal. For example, the orientation signals are orientated at (0,0) or are embedded at the same translation, but the data payload is shifted (e.g., circularly shifted) in one of the two watermarks. This embodiment carries more data since the orientation between the gird and data payload can be pixel accurate, and not dependent upon print, thus able to carry 14 bits for a 128×128 pixel grid. However, the translation of the data payload may require a brute force detection of 128×128 possibilities since it is not synchronized with the grid. In these embodiments, the watermark is repeated. For example, the same watermark key and payload is repeated spatially across multiple tiles. For robustness, the same orientation is preferably maintained in each repetitive tile. If robustness is not an issue, each repetitive tile can of course have a different orientation, thus increasing data carrying capacity as gauged relative to individual titles, but at the expense of robustness.

We note that orientation data is not limited to detecting a separate orientation signal, as an orientation can be obtained from detecting a watermark payload, such as via brute force methods to correlate a pseudo-random (PN) key and embedded data. However, a separate orientation signal can speed detection of a watermark and relative orientations between watermarks.

Channels Fluorescing in Different Spectrums

Some of the above implementations disclose digital watermarks that, when illuminated in an ultraviolet or infrared spectrum, visibly illuminate or fluoresce in the visible spectrum. While this type of illumination is preferred, the present invention is not so limited. Instead, many of the above implementation can be carried out with materials that, when illuminated in an ultraviolet or infrared spectrum, illuminate or fluoresce in the ultraviolet or infrared spectrums. An optical sensor can include optical filters (or non-visible receptors) to capture a corresponding infrared or ultraviolet image. Or, as an alternative, multiple sensors, each tuned to a particular light spectrum (or frequency) can each capture image data in its respective spectrum.

Concluding Remarks

To provide a comprehensive disclosure without unduly lengthening this specification, each of the above-identified patent documents is herein incorporated by reference.

Having described and illustrated the principles of the invention with reference to illustrative embodiments, it should be recognized that the invention is not so limited. The present invention finds application beyond such illustrative embodiments.

Other elements and techniques can similarly be combined to yield further implementations within the scope of the present invention. Thus, for example, single-bit watermarking can be substituted for multi-bit watermarking, local scaling of watermark energy can be provided to enhance watermark signal-to-noise ratio without increasing human perceptibility, encoding may proceed at the granularity of a single pixel (or DCT coefficient), or may similarly treat adjoining groups of pixels (or DCT coefficients), the encoding can be optimized to withstand expected forms of content corruption. Thus, the exemplary embodiments disclosed herein are only selected samples of the solutions available in accordance with the present invention. The other solutions necessarily are not exhaustively described herein, but are fairly within the understanding of an artisan given the foregoing disclosure and familiarity with the art.

The section headings in this document are not meant to be limiting; but rather, are provided for the reader's convenience. Thus, disclosure under one section heading can be readily applied or combined with the disclosure under another section heading.

While the preferred implementations have been illustrated with respect to an identification document the present invention is not so limited. Indeed, the inventive methods can be applied to other types of objects as well, including, but not limited to: checks, traveler checks, banknotes, legal documents, printed documents, in-mold designs, printed plastics, product packaging, labels and photographs.

Also, while the preferred implementations have focused on three digital watermarks, the inventive methods will apply to three or more watermarks as well. Similarly, while some of the preferred implementation have centered on identification documents including a visible channel watermark, an infrared channel watermark and an ultraviolet channel watermark, the present invention is not so limited. Indeed our inventive methods can be used to improve other multi-watermark schemes as well, like three or more watermarks in a visible channel, or a watermark in a visible channel cooperating with two or more watermarks in different, non-visible channels. Or one or more infrared channels can cooperate with one or more ultraviolet channels, etc. And different watermarks can be conveyed by the same material, but in different domains (e.g., spatial, frequency, wavelet, DCT, etc.).

Also, the use of arrows in the figures to convey orientation information is merely intended to ease the discussion and is not meant to limit the present invention. Of course, analysis of an orientation component will typically yield a watermark's orientation in terms of, e.g., scale, rotation, translation, starting message location and/or frequency-domain characteristics, etc. An orientation component is preferably not visible perceptible (unlike the illustrated arrows) and may even be determined through a frequency-domain based analysis.

The implementation of some of the functionality described above (including watermark or steganographic encoding and decoding) can be implemented by suitable software, stored in memory for execution on an associated processor or processing circuitry. In other implementations, the functionality can be achieved by dedicated hardware, or by a combination of hardware and software. Reprogrammable logic, including FPGAs, can advantageously be employed in certain implementations.

In view of the wide variety of embodiments to which the principles and features discussed above can be applied, it should be apparent that the detailed embodiments are illustrative only and should not be taken as limiting the scope of the invention. Rather, we claim as our invention all such modifications as may come within the scope and spirit of the following claims and equivalents thereof.

What is claimed is:

1. A method of carrying a plural-bit digital watermark payload in host media content, said method comprising:
utilizing a configured multi-purpose electronic processor, providing a first digital watermark signal comprising a first orientation component in the host media content;
utilizing a configured multi-purpose electronic processor, providing a second digital watermark signal comprising a second orientation component in the host media content; and
carrying a plural-bit digital watermark payload in the host media content through a relative orientation relationship between the first digital watermark orientation component and the second digital watermark orientation component.

2. The method of claim 1, further comprising:
utilizing a configured multi-purpose electronic processor, providing a third digital watermark signal in the host media content, the third digital watermark signal comprising a third orientation component, wherein said act of carrying comprises carrying the plural-bit digital watermark payload through a relative orientation relationship of the first orientation component with the second and third orientation components.

3. The method of claim 1, wherein the first digital watermark signal comprises a first plural-bit message component and the second digital watermark signal comprises a second plural-bit message component.

4. The method of claim 1, wherein the relative orientation relationship is determined in terms of at least one of rotation, scale or translation.

5. The method of claim 3, wherein the first orientation component is useful to orient image or video data to read the first message component, and wherein the second orientation component is useful to orient image or video data to read the second message component.

6. A method comprising:
utilizing a configured multi-purpose electronic processor, hiding a first steganographic signal in media, the media representing audio or video, the first steganographic signal comprising a first orientation or calibration signal;

utilizing a configured multi-purpose electronic processor, hiding a second steganographic signal in the media, the second steganographic signal comprising a second orientation or calibration signal;

whereby a plural-bit steganographic payload is carried in the media via a relative relationship between the first orientation or calibration signal and the second orientation or calibration signal.

7. The method of claim 6 wherein the first steganographic signal further comprises a first plural-bit message component and the second steganographic signal comprises a second plural-bit message component.

8. The method of claim 7 wherein the first orientation or calibration signal provides orientation or calibration information useful to detect the first message component.

9. The method of claim 8 wherein the second orientation or calibration signal provides orientation or calibration information useful to detect the second message component.

10. The method of claim 6, wherein the relative relationship is provided in terms of at least one of rotation, scale or translation.

11. The method of claim 6 wherein the media comprises at least one of video, imagery or audio.

12. The method of claim 6 further comprising providing the media on a physical object through printing or engraving.

13. A method comprising:
obtaining a plural-bit message;
obtaining a host signal representing audio or video;
utilizing a configured multi-purpose electronic processor, steganographically hiding the plural-bit message in the host signal in a steganographic manner through one or more relative orientations of two or more steganographic signal components.

14. The method of claim 13 wherein a first of the two or more steganographic signal components provides orientation or calibration signal information useful to detect the message.

15. The method of claim 14 wherein a second of the two or more steganographic signal components provides orientation or calibration signal information useful to detect a second, different message that is carried in the host signal.

16. The method of claim 13, wherein the relative orientation is provided in terms of at least one of rotation, scale or translation.

17. The method of claim 13 wherein the media comprises at least one of video, imagery or audio.

18. The method of claim 13 further comprising providing the media on a physical object through printing or engraving.

19. A computer readable media comprising instructions stored thereon to cause a multi-purpose computer processor to perform the acts of claim 1.

* * * * *